United States Patent
Boutaghou

[11] Patent Number: 5,817,931
[45] Date of Patent: Oct. 6, 1998

[54] GLIDE DETECT HEAD WITH PREDICTABLE ASPERITY CONTACT REGION

[75] Inventor: Zine-Eddine Boutaghou, Vadnais Heights, Minn.

[73] Assignee: Seagate Technology, Inc., Scotts Valley, Calif.

[21] Appl. No.: 897,524

[22] Filed: Jul. 21, 1997

Related U.S. Application Data

[60] Provisional application No. 60/043,542 Apr. 14, 1997.
[51] Int. Cl.[6] .................................................. G01B 5/28
[52] U.S. Cl. ................................................... 73/105
[58] Field of Search ............................. 73/105; 360/103

[56] References Cited

U.S. PATENT DOCUMENTS

| | | | |
|---|---|---|---|
| 5,406,432 | 4/1995 | Murray | 360/103 |
| 5,488,524 | 1/1996 | Cunningham | 360/103 |
| 5,612,839 | 3/1997 | Jacques | 360/103 |
| 5,640,089 | 6/1997 | Horikawa et al. | 73/105 X |
| 5,689,064 | 11/1997 | Kennedy et al. | 73/105 |

OTHER PUBLICATIONS

Yeack–Scranton, "Novel Piezoelectric Transducers to Monitor Head–Disk Interactions", IEEE Transactions on Magnetics, vol. MAG–22, No. 5, Sep. 1986, pp. 1011–1016.

*Primary Examiner*—Michael Brock
*Assistant Examiner*—Daniel S. Larkin
*Attorney, Agent, or Firm*—Westman, Champlin & Kelly, P.A.

[57] ABSTRACT

A glide detect head includes a slider and a transducer. The slider includes a slider body with a leading edge, a trailing edge, and a slider surface therebetween. Substantially parallel rails are spaced apart and extend from the leading edge to a location spaced from the trailing edge. An asperity contact tab is disposed on the slider surface proximate the trailing edge such that asperity contact between the glide detect head and asperities occurs at the asperity contact tab. The transducer is disposed on the asperity contact tab for providing and output based upon asperity contact.

20 Claims, 5 Drawing Sheets

GLIDE DETECT HEAD WITH PREDICTABLE ASPERITY CONTACT REGION

BACKGROUND OF THE INVENTION

This application claims the benefit of U.S. Provisional Patent Application No. 60/043,542, filed Apr. 14, 1997, entitled "GLIDE DETECT HEAD WITH PREDICTABLE ASPERITY CONTACT REGION."

The present invention relates to systems for analyzing rotating recording discs. More specifically, the present invention relates to an apparatus for detecting small defects on the surface of the rotating recording disc.

In data processing systems, magnetic disc drives are often used as direct access storage devices. In such devices, read/write heads are used to write data on or read data from an adjacently rotating hard or flexible disc. To prevent damage to either the disc or the read/write head, it has been recognized that the surface of the disc should be very flat and free of any bumps or the like which might be contacted by the read/write head. Also, the read/write heads have been designed so that they will fly over the surface of the rotating disc with a small fly height which is maintained by a film of air. During its flight, the head undergoes continuous vibration, pitch and roll as the topography of the disc changes beneath the head. If the quality of the disc or the read/write head is poor, occasional rubbing or sharp contact may occur between the disc and the read/write head. Such contact may damage the head or the disc, cause loss of valuable data, or all of these.

In order to provide increased assurance that such undesirable contact between a read/write head and a recording disc does not occur, the disc is generally mapped to locate small defects, or "asperities" thereon. Once such asperities are located, they can be dealt with. One way of dealing with mapped asperities is to remove the asperities through processes such as burnishing or the like. Additionally, if the asperities are not to be removed, then the location of such asperities can be stored on the disc, or in other appropriate storage such that when the disc drive operates, it does not store information or read information at the location of asperities. As can be seen, for both methods of dealing with asperities, it is very important to precisely determine the location of such asperities. In addition, with the market tightening and technical requirements (such as fly height and speed) becoming more exacting and demanding, inspection schemes which are more accurate are highly advantageous.

SUMMARY OF THE INVENTION

A glide detect head of the type used to map asperities on a disc surface is disclosed and includes a slider and a transducer. The slider includes a slider body with a leading edge, a trailing edge, and a slider surface therebetween. Substantially parallel rails are spaced apart and extend from the leading edge to a location spaced from the trailing edge. An asperity contact tab is disposed on the slider surface proximate the trailing edge such that asperity contact between the glide detect head and asperities occurs at the known location of the asperity contact tab. The transducer is disposed on the asperity contact tab for providing an output based upon asperity contact.

DETAILED DESCRIPTION OF THE PREFERRED EMBODIMENTS

Figure 1:
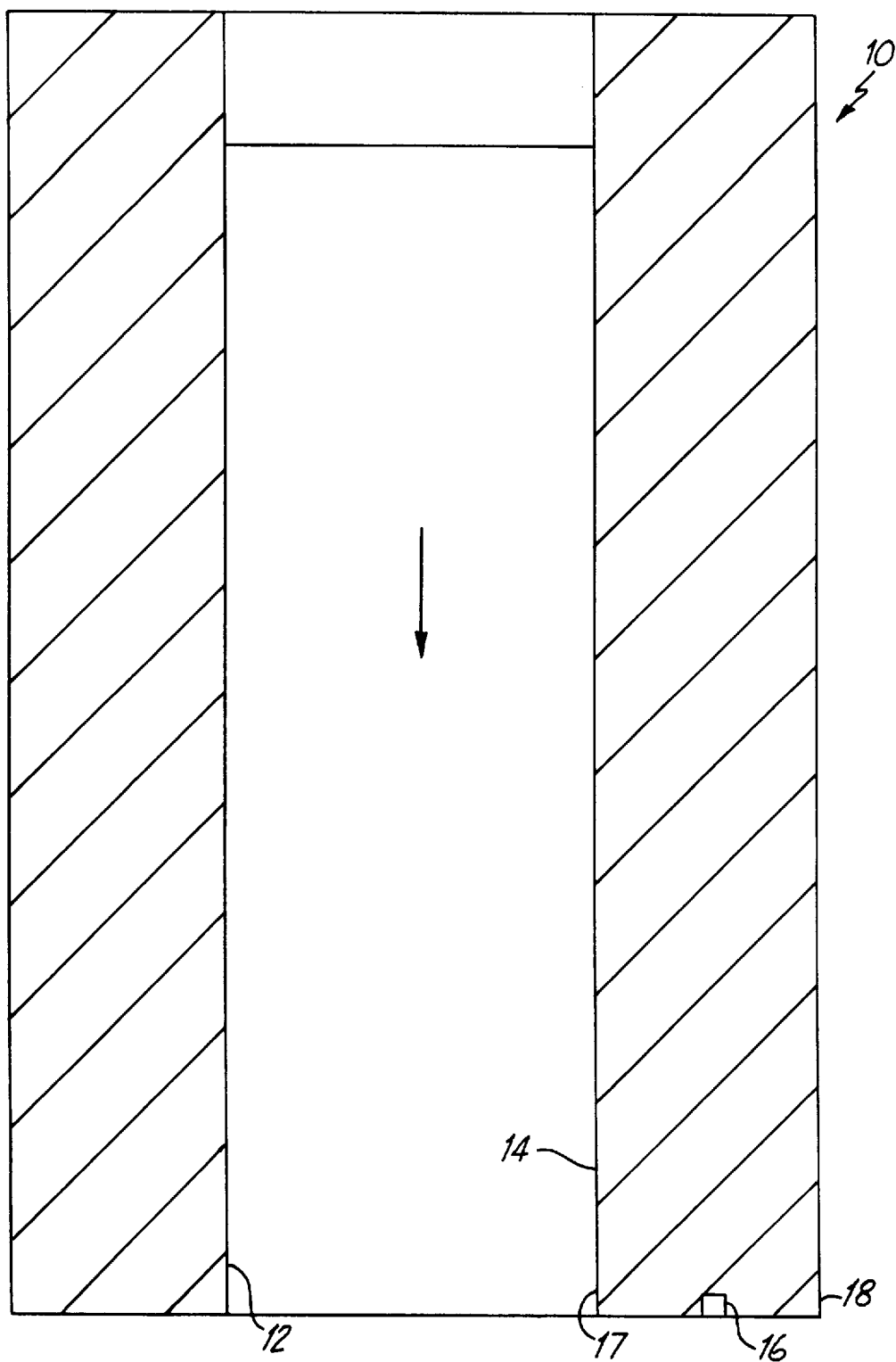
FIG. 1 is bottom plan view of a conventional glide detect head.

FIG. 1 is a bottom plan view of conventional glide detect head 10. Conventional glide detect head 10 generally includes first rail 12 and second rail 14. Rails 12, 14 are generally parallel and provide aerodynamic lift to glide detect head 10 as is known in the art. Glide detect head 10 also includes detect transducer 16 which is generally an MR sensor. When detect head 10 collides with an asperity, detect head 10 pitches and rolls away from the asperity. However, the collision still causes friction between the asperity and rail 14 thereby generating heat. The collision-generated heat raises the temperature of rail 14 which also raises the temperature of detect transducer 16. As the temperature of detect transducer 16 increases, its signal (generally resistance) changes accordingly. In this manner, conventional detect head 10 is able to detect asperities on a disc.

As can be seen in FIG. 1, transducer 16 will provide a signal based on any heat to which it is exposed. Additionally, because the height of asperities on a disc varies, a given signal from transducer 16 based upon an asperity contact will depend on the height of the asperity (the degree of interference between the asperity and glide detect head 10) and the location of the collision on rail 14. Thus, based on the signal from transducer 16 the location of the asperity contact with rail 14 cannot be determined to any precision greater than one half of the width of rail 14. Further, because the location of the asperity contact with rail 14 cannot be precisely determined, the height of the asperity cannot be determined.

Through experimentation, it has been found that a slider will accommodate an asperity collision by moving in various ways. First, a slider may roll about its longitudinal axis or it may pitch about its transverse axis, as will be described with respect to FIG. 5. It has also been found that a slider will usually roll more easily than it will pitch. Thus, when an asperity of given height collides with rail 14, the collision will generate different signals depending on whether it occurs at an inner portion 17 of rail 14, or at an outer portion 18. It has also been found that a collision at outer portion 18 will generate a larger rms transducer signal than one occurring at inner portion 17.

Figure 2:
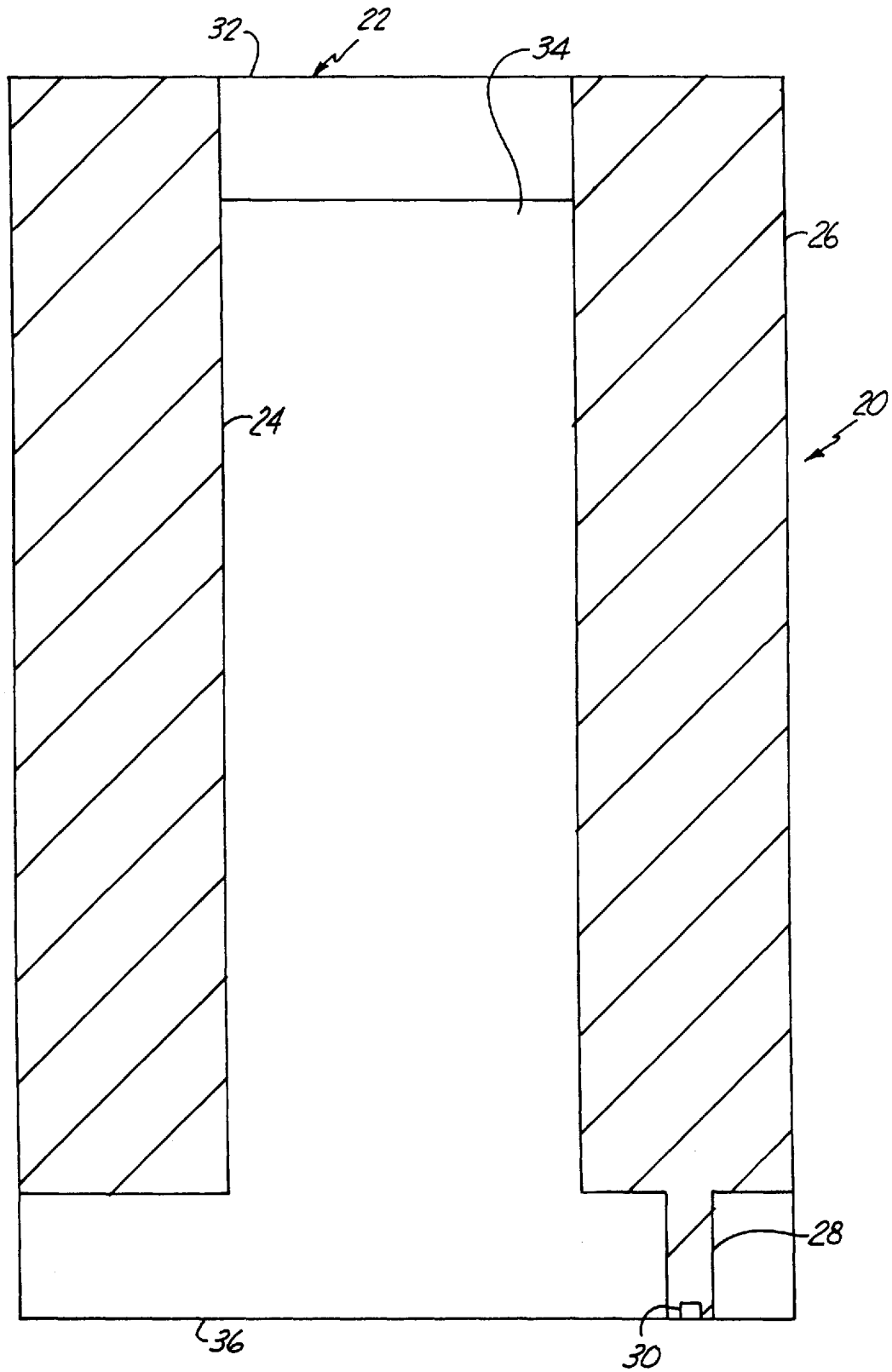
FIG. 2 is a bottom plan view of a glide detect head in accordance with the present invention.
Figure 3:
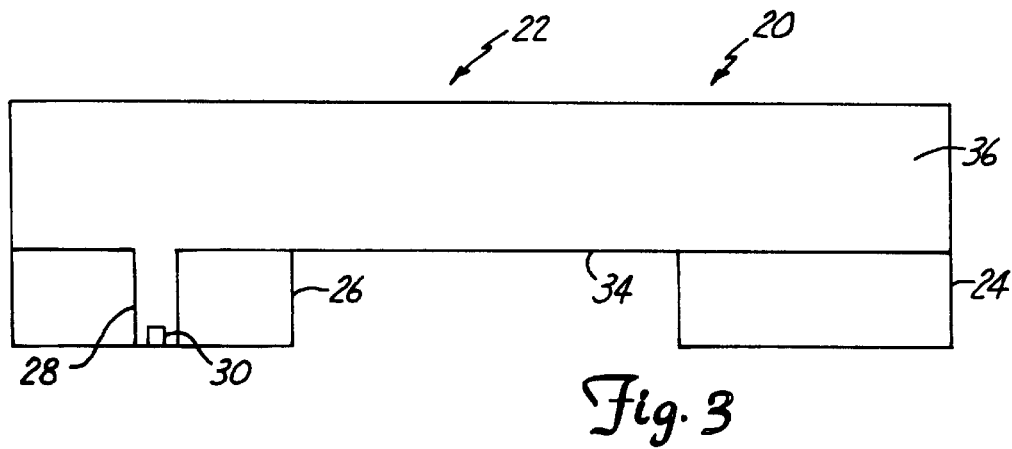
FIG. 3 is a rear elevation view of a glide detect head in accordance with the present invention.

FIGS. 2 and 3 are bottom plan, and rear elevation views, respectively, of glide detect head 20 in accordance with the present invention. Glide detect head 20 preferably includes glide detect slider body 22, first rail 24, second rail 26, asperity contact tab 28, and detect transducer 30. Preferably, first rail 24 and second rail 26 have dimensions similar to conventional sliders. Thus, first rail 24 and second rail 26 preferably each have a rail width of about 350 $\mu$m.

Slider body 22 is preferably rectangular and includes leading edge 32, slider surface 34, and trailing edge 36.

Together, first rail 24, second rail 26, and slider surface 34 create an air bearing surface which generates lift for glide detect head 20 enabling it to fly over the surface of a disc. Glide detect head 20 flies similarly to conventional sliders in that leading edge 32 generally flies higher than trailing edge 36.

As can be seen, the region of asperity contact tab 28 proximate transducer 30 flies closest to the disc. Thus, collisions between glide detect head 20 and any asperities on the surface of the disc occur generally at asperity contact tab 28, and are sensed or detected by transducer 30. In this manner, the location of the asperity on the disc can be determined to a precision of about one half the width of asperity contact tab 28. Preferably, asperity contact tab 28 has a width less than about 75 μm. More preferably asperity contact tab 28 has a width less than about 50 μm. However, tab widths ranging from about 5 μm to about 150 μm should provide sufficient precision to produce advantageous results. Additionally, the relationship between the width of rails 24, 26 and the width of asperity contact tab 28 may be expressed as a ratio. Thus, rail width over tab width may range from about 70:1 to about 7:3.

As can be appreciated, the response of transducer 30 to a collision between contact tab 28 and an asperity will be more indicative of asperity height than the response of glide detect heads of the prior art. This is because location is now essentially known (at the precision of about one half of the width of asperity contact tab 28) such that the only remaining variable which substantially affects transducer response is asperity height. Additionally, a precision of about one half of 5 μm (or 2.5 μm) now allows for the detection of asperities within a single data track, which typically has a track width of about 2 μm. Therefore, glide detect head 20 of the present invention provides more accurate asperity detection than the prior art.

Figure 4:
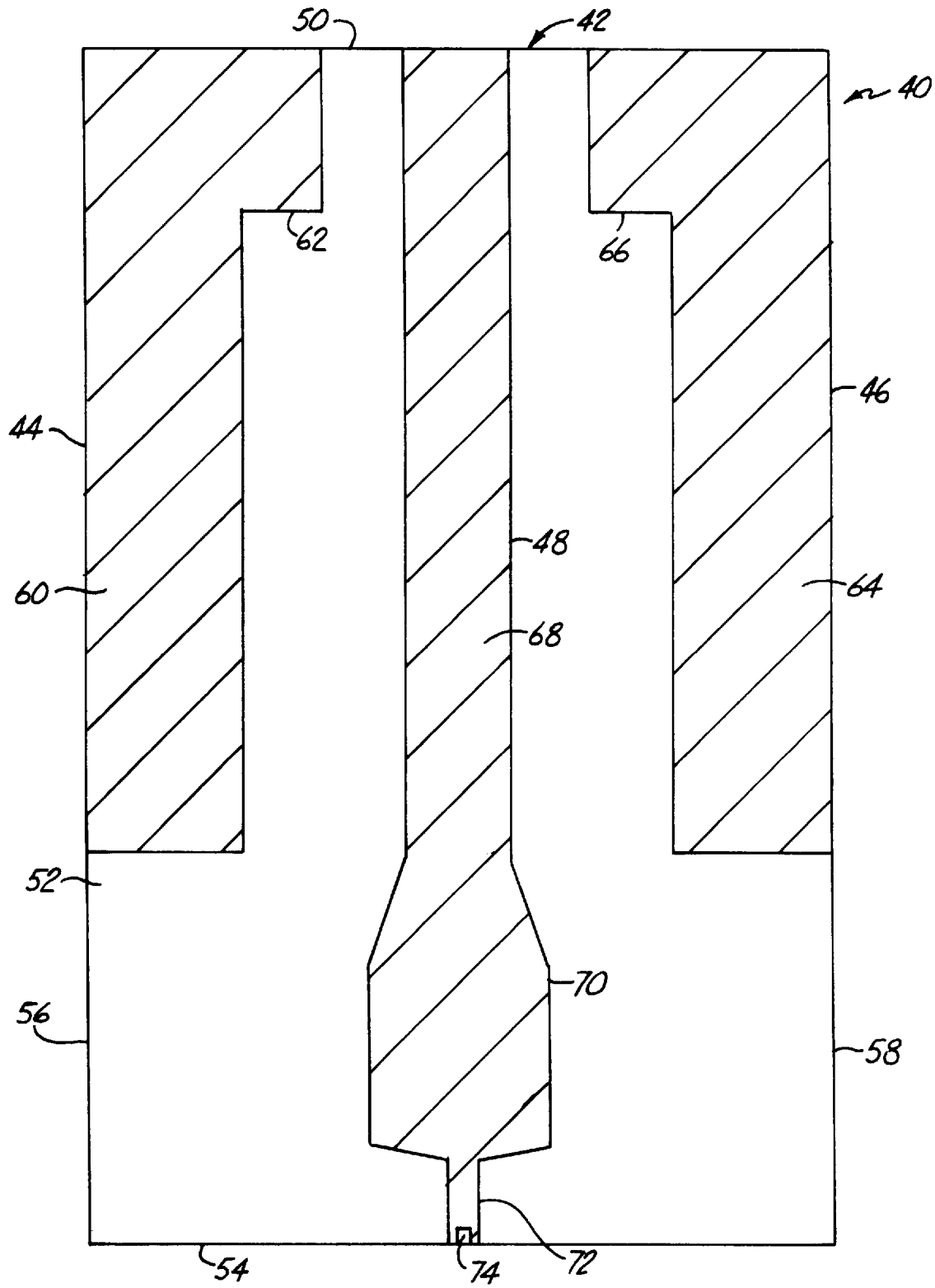
FIG. 4 is a bottom plan view of a glide detect head in accordance with an alternate embodiment of the present invention.

FIG. 4 is a bottom plan view of glide detect head 40 in accordance with an alternate embodiment of the present invention. Glide detect head 40 includes glide detect slider body 42 which includes first rail 44, second rail 46, center rail 48, leading edge 50, slider surface 52, trailing edge 54, first lateral edge 56, and second lateral edge 58.

First rail 44 is preferably disposed on surface 52, contiguous with first lateral edge 56. First rail 44 also extends from leading edge 50 to a location spaced apart from trailing edge 54. First rail 44 provides first air bearing surface 60 which generates lift when glide detect head 40 flies over a disc. Further, first rail 44 also preferably includes transverse leading portion 62 which is contiguous with leading edge 50 and extends transversely from first rail 44 in a direction of second rail 46.

Second rail 46 is essentially a mirror image of first rail 44. Second rail 46 is disposed on surface 52, contiguous with second lateral edge 58. Second rail 46 extends from leading edge 50 to a location spaced apart from trailing edge 54. Second rail 46 provides second air bearing surface 64 which generates lift when glide detect head 40 flies over the surface of a disc. Preferably, second rail 46 includes transverse leading portion 66 which is contiguous with leading edge 50 and extends transversely from second rail 46. First rail 44 and second rail 46 each preferably have a rail width of 350 μm or greater.

Center rail 48 is preferably disposed on surface 52 substantially halfway between first rail 44 and second rail 46. Center rail 48 extends from leading edge 50 to a location spaced apart from trailing edge 54. Center rail 48 preferably has a rail width similar to that of rails 44 and 46. Center rail 48 includes air bearing surface 68 which provides lift to glide detect head 40 as glide detect head 40 flies above a disc. Center rail 48 also preferably includes flared portion 70. As can be seen, the flying pitch of glide detect head 40 (angle of departure from horizontal) can be varied depending on the size of transverse leading portions 62 and 66, and flared portion 70.

Asperity contact tab 72 is disposed on surface 52 and preferably extends from flared portion 70 to trailing edge 54. Asperity contact tab 72 is also preferably centered on a midpoint of trailing edge 54. Detect transducer 74 is disposed on asperity contact tab 72, preferably on a rear-most portion of asperity contact tab 72.

As with the two-rail embodiment described with respect to FIGS. 2 and 3, the relatively narrow width of asperity contact tab 72 provides precise location identification of asperities which impact asperity contact tab 72 and which are sensed or detected by asperity transducer 74.

Figure 5:
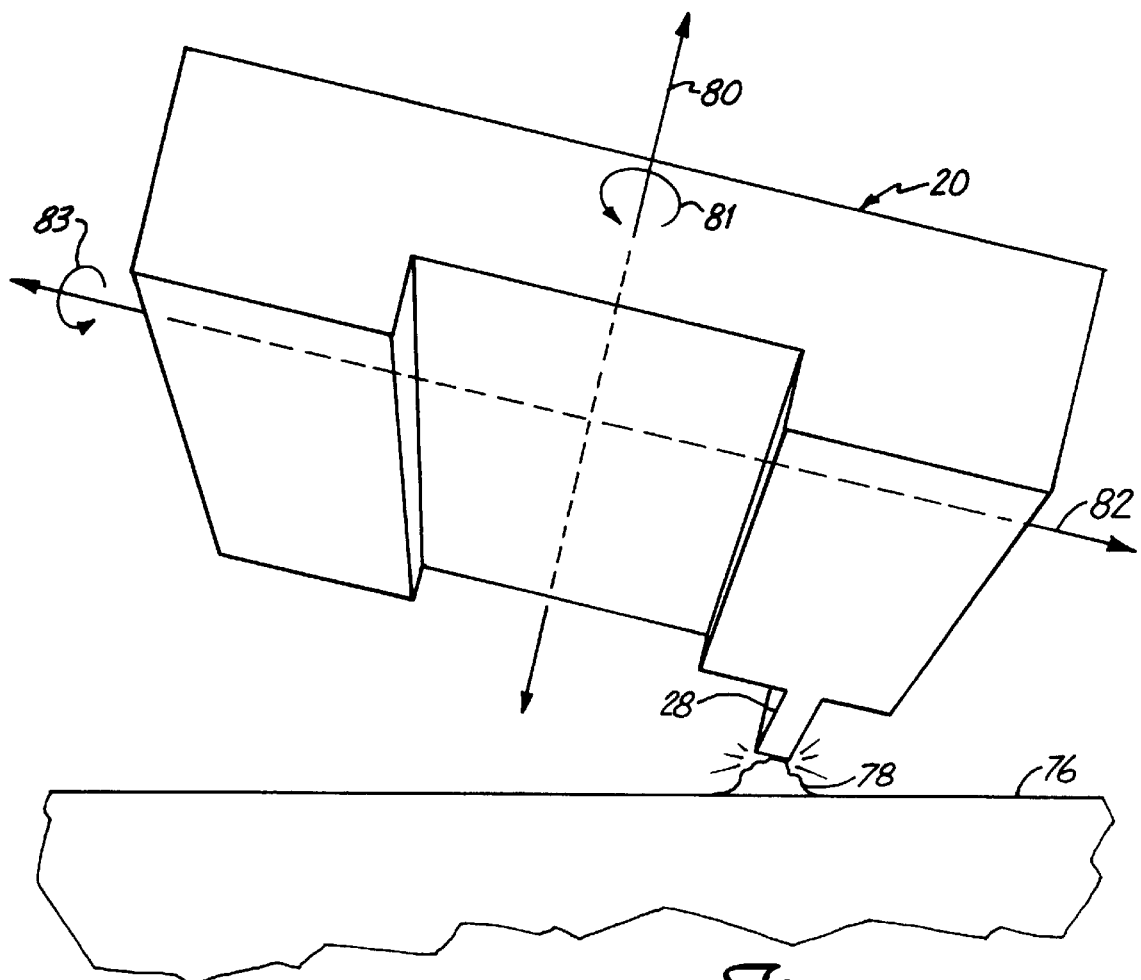
FIG. 5 is a front perspective view of a glide detect head in accordance with the present invention.

FIG. 5 is a front perspective view of glide detect head 20 flying over disc 76, and colliding with asperity 78. Glide detect head 20 is attached to a load beam (not shown) through a gimbal (not shown) thus, glide detect head 20 is allowed to roll and pitch as it flies above disc 76. When asperity contact tab 28 collides with asperity 78, glide detect head 20 rolls about longitudinal axis 80 in a direction indicated by arrow 81, and pitches about transverse axis 82 in a direction indicated by arrow 83. As described above, the collision energy needed to cause glide detect head 20 to roll about longitudinal axis 80 has been found to be much less than the energy required to cause glide detect head 20 to pitch about transverse axis 82. Thus, in the situation shown in FIG. 5 where asperity 78 collides with asperity contact tab 28, glide detect head 20 will mainly roll about longitudinal axis 80.

Referring back to FIG. 4, it can be appreciated that the characteristic response of the center-rail embodiment (shown in FIG. 4) will be different then that of the side rail embodiment (shown in FIGS. 2, 3 and 5). Centering contact asperity tab 72 on trailing edge 54 provides that asperity collisions occurring at contact asperity tab 72 will cause no substantial rolling of glide detect head 40. In this way asperity detection can now provide a more accurate determination of both the location and the height of a given asperity on a disc.

Figure 6:
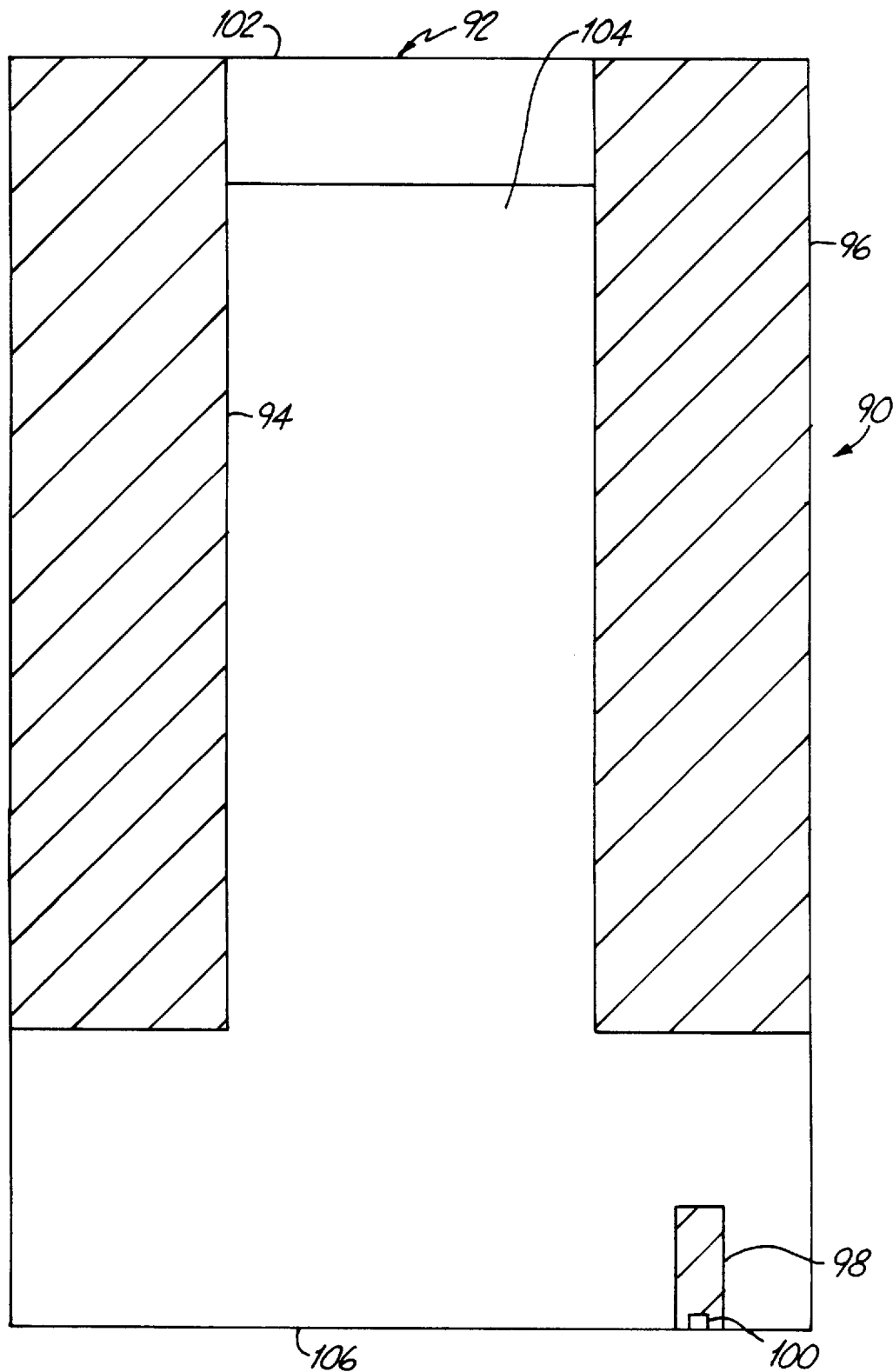
FIG. 6 is a bottom plan view of a glide detect head in accordance with another alternate embodiment of the present invention.

FIG. 6 is a bottom plan view of glide detect head 90 in accordance with the present invention. Glide detect head 90 is very similar to glide detect head 20 shown in FIGS. 2, 3, and 5. As such, glide detect head 90 preferably includes glide detect slider body 92, first rail 94, second rail 96, asperity contact tab 98, and detect transducer 100.

Glide detect slider body 92 is preferably rectangular and includes leading edge 102, slider surface 104, and trailing edge 106. Glide detect head 90 differs from glide detect head 20 in that asperity contact tab 98 is not contiguous with any rail. However, because asperity contact tab 98 is proximate trailing edge 106, asperity contact between glide detect head 90 and asperities will occur at asperity contact tab 98. As can also be appreciated, the contact asperity tabs do not even need to be disposed behind a rail.

Thus, three embodiments of the present invention have been provided which insure that contact between an asperity and the glide detect head occurs at only one location and causes preferably only one type of slider motion (pitching or rolling). Thus, the glide detect heads of the present invention provide an output signal which is dependent almost exclusively on the height of an asperity.

Although the present invention has been described with reference to preferred embodiments, workers skilled in the art will recognize that changes may be made in form and detail without departing from the spirit and scope of the invention.

What is claimed is:

1. A glide detect head for detecting asperities on a disc, the glide detect head comprising:

a glide detect slider comprising:

a glide detect slider body having a leading edge, a trailing edge, and a slider surface therebetween;

a first rail having a first width, and disposed on the slider surface extending from the leading edge to a location spaced apart from the trailing edge;

a second rail having a second width, and disposed on the slider surface in spaced-apart alignment with the first rail, the second rail extending from the leading edge to a location spaced apart from the trailing edge;

an asperity contact tab having a tab width less than either of the first width or second width, the contact tab disposed on the slider surface proximate the trailing edge; and a transducer disposed on the asperity contact tab providing a transducer signal based upon collision between the asperity contact tab and an asperity on the disc.

2. The glide detect head of claim 1 wherein a ratio of one of the first rail width and the second rail width over the tab width is greater than about 2.3 and less than about 70.

3. The glide detect head of claim 1 wherein the tab width is greater than about 5 $\mu$m and less than about 150 $\mu$m.

4. The glide detect head of claim 3 wherein the tab width is less than about 75 $\mu$m.

5. The glide detect head of claim 4 wherein the tab width is less than about 50 $\mu$m.

6. The glide detect head of claim 1 wherein the asperity contact tab is contiguous with the trailing edge.

7. The glide detect head of claim 6 wherein the asperity contact tab extends from one of the first and second rails to the trailing edge.

8. The glide detect head of claim 1 wherein the transducer is substantially centered on the asperity contact tab in relation to the tab width.

9. The glide detect head of claim 1 wherein the width of the first rail is about 350 $\mu$m and the width of the second rail is about 350 $\mu$m.

10. A glide detect head for detecting asperities on a disc, the glide detect head comprising:

a glide detect slider comprising:

a glide detect slider body having a leading edge, a trailing edge and a slider surface therebetween;

a first rail having a first width, and disposed on the slider surface extending from the leading edge to a location spaced apart from the trailing edge;

a second rail having a second width, and disposed on the slider surface in spaced-apart alignment with the first rail, the second rail extending from the leading edge to a location spaced apart from the trailing edge;

a center rail having a leading portion disposed proximate the leading edge, and a trailing portion spaced from the trailing edge, the center rail disposed on the slider surface and spaced between the first and second rails;

an asperity contact tab having a tab width greater than about 5 $\mu$m and less than about 150 $\mu$m, the asperity contact tab disposed on the slider surface proximate the trailing edge; and a transducer disposed on the asperity contact tab providing a transducer signal based upon collision between the asperity contact tab and an asperity on the disc.

11. The glide detect head of claim 10 wherein the tab width is less than about 75 $\mu$m.

12. The glide detect head of claim 11 wherein the tab width is less than about 50 $\mu$m.

13. The glide detect head of claim 10 wherein the asperity contact tab is contiguous with the trailing edge.

14. The glide detect head of claim 10 wherein the asperity contact tab extends from the center rail to the trailing edge.

15. The glide detect head of claim 10 wherein the center rail is spaced substantially equidistant from the first and second rails.

16. The glide detect head of claim 10 wherein:

the first rail further comprises a first transverse portion contiguous with the leading edge, and extending transversely from the first rail toward the second rail;

the second rail further comprises a second transverse portion contiguous with the leading edge, and extending transversely from the second rail toward the first rail; and the rear portion of the center rail is flared such that the center rail width increases as a function of a distance from the leading edge.

17. A glide detect head for detecting asperities on a disc, the glide detect head comprising:

a glide detect slider comprising:

a glide detect slider body having a leading edge, a trailing edge, and a slider surface therebetween;

a first rail having a first width, and disposed on the slider surface extending from the leading edge to a location spaced apart from the trailing edge;

a second rail having a second width, and disposed on the slider surface in spaced-apart alignment with the first rail, the second rail extending from the leading edge to a location spaced apart from the trailing edge; and an asperity contact tab having a tab width and disposed on the slider surface proximate the trailing edge;

a transducer disposed on the asperity contact tab providing a transducer signal based upon collision between the asperity contact tab and an asperity on the disc; and wherein the width of the contact tab, and the placement of the transducer along the width of the contact tab are selected such that the transducer signal indicates a position of the asperity on the disc to a precision greater than about 75 $\mu$m.

18. The glide detect head of claim 17 wherein the asperity contact tab is contiguous with the trailing edge.

19. The glide detect head of claim 17 wherein the asperity contact tab extends from one of the first and second rails to the trailing edge.

20. The glide detect head of claim 17 wherein the precision is greater than about 3 $\mu$m.

* * * * *